(No Model.) 2 Sheets—Sheet 1.

M. E. HUNT.
CULTIVATOR.

No. 411,812. Patented Oct. 1, 1889.

Witnesses:
Louis G. Susemihl
Chas Hibbard

Inventor:
Marshall E. Hunt
per Wm K White
Attorney.

(No Model.)  2 Sheets—Sheet 2.
M. E. HUNT.
CULTIVATOR.
No. 411,812.  Patented Oct. 1, 1889.
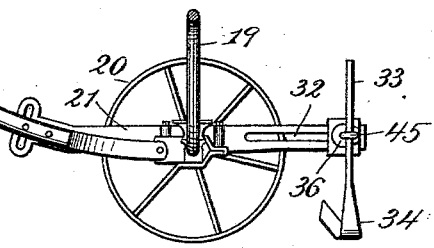
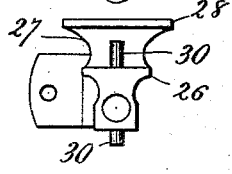
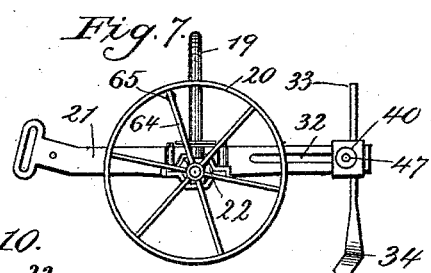
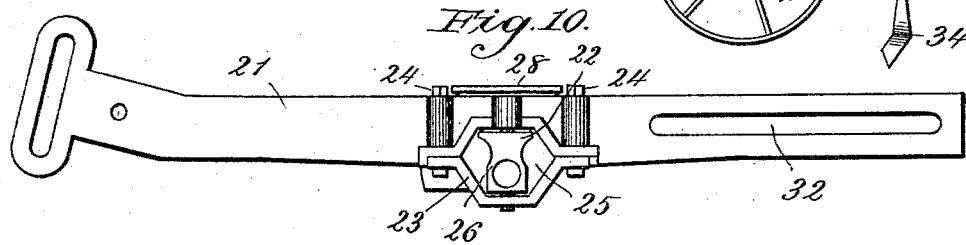
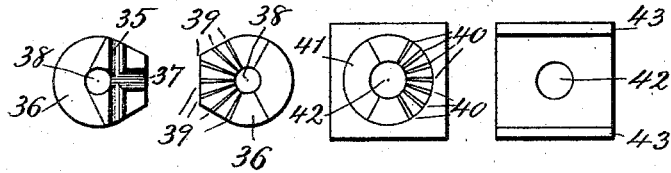
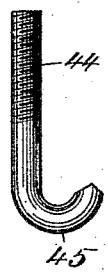
Witnesses:
Louis G. Lurmihl
Chas Hibbard
Inventor:
Marshall E. Hunt
per Wm K White
Attorney.

UNITED STATES PATENT OFFICE.

MARSHELL E. HUNT, OF DAVENPORT, IOWA, ASSIGNOR OF ONE-HALF TO HIRAM P. GOODWIN AND ADAM M. DEDRICK, BOTH OF SAME PLACE.

CULTIVATOR.

SPECIFICATION forming part of Letters Patent No. 411,812, dated October 1, 1889.

Application filed February 7, 1889. Serial No. 299,082. (No model.)

*To all whom it may concern:*

Be it known that I, MARSHELL E. HUNT, a citizen of the United States, residing at Davenport, in the county of Scott and State of Iowa, have invented a new and useful Cultivator and Seeder Attachment, of which the following is a specification.

My invention relates to a class of machines more particularly intended for planting seeds for garden vegetables and cotton and the cultivation of the same and to be operated by manual power; but, however, I do not limit myself in the operation of my machine to such class of seeds in planting or cultivating, nor to such power for operating the machine.

The objects of my invention are, first, to attach the implements intended to cultivate the plants forward of the axle; second, to have one of the beams rotate on the axle while the other rotates with the axle, so that said beams may be lifted or depressed independently of each other, and, third, to provide engaging-surfaces on the inner side of one of the wheels to engage at fixed distances of rotation of said wheel with mechanism attached to a seeder when carried upon the frame of said cultivator for the purpose of controlling the dropping of seed from the hopper of said seeder into the seed-drill.

The invention is shown in connection with an ordinary two-wheeled cultivator having an arched axle and two beams with rearwardly-extending handles, capable of lateral and vertical movement. I attain these objects by the mechanism illustrated in the accompanying drawings, in which—

Figure 1:
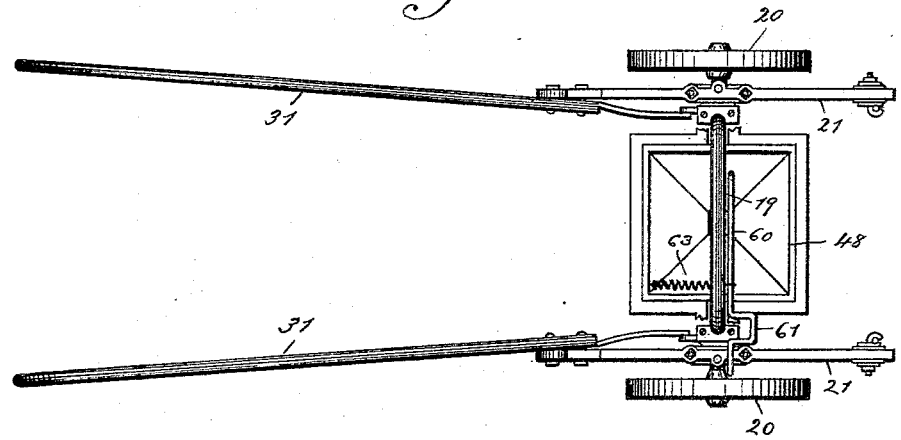
Figure 4:
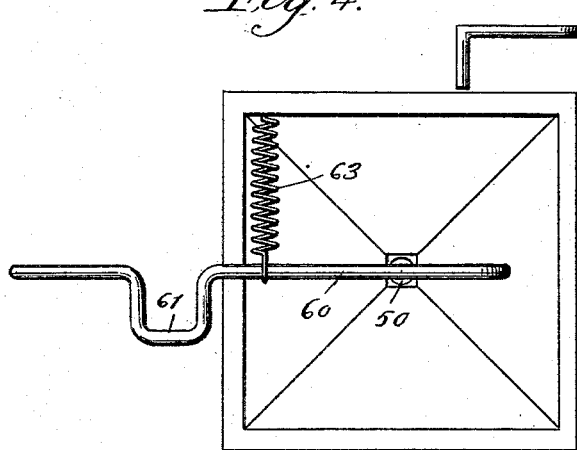
Figure 3:
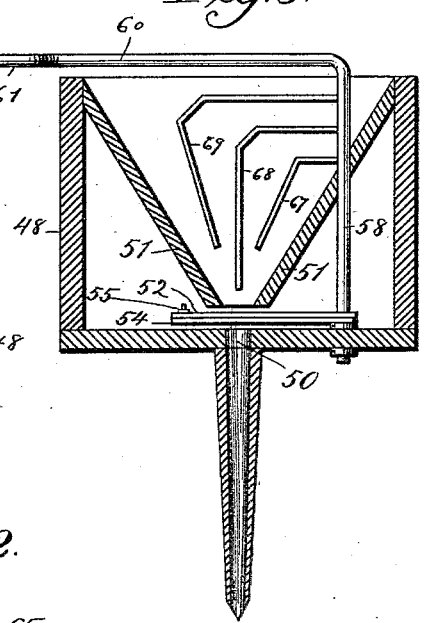
Figure 5:
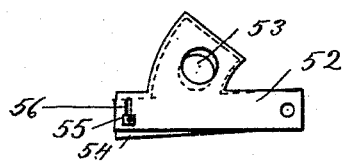
Figure 2:
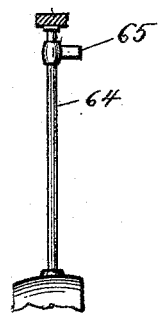

Figure 1 is a plan view of the cultivator and seeder attached. Fig. 2 is a view of one of the spokes of the wheel with the inner engaging-surface attached, a section of the felly and hub being shown. Fig. 3 is a view of a vertical section of the seeder through its center. Fig. 4 is a top view of the seeder shown in Fig. 3, together with the bar engaging with the inner engaging-surface of the wheel. Fig. 5 is a plan view of the plates for regulating the supply of seed to the seed-drill. Fig. 6 is a vertical view of the inner side of the machine, the seeder attachment being removed. Fig. 7 is a view of the right-hand side of the machine, the handles being removed. Fig. 8 is a side view of the right-hand side sleeve. Fig. 9 is a rear view of the right-hand side sleeve. Fig. 10 is an outside view of the right-hand side beam, the pendent cultivating implement being removed, and showing the position of the sleeve in cross-opening through said beam; and Figs. 11, 12, 13, 14, and 15 are detail views of the mechanism for attaching the pendent cultivating implement to the front end of the beam.

Similar figures refer to similar parts throughout the several views.

18 is an axle having vertical parts 19, and 20 are wheels supporting the extreme ends of such axle. Two beams 21 are grooved crosswise on their under side, as at 22, having concaved plates 23 secured to the under side of the beams by the bolts and nuts 24, so as to leave the cross opening or aperture 25. Sleeves 26 are loosely fitted upon the axle 18 between its vertical parts 19 and the inner side of the hub of each wheel, each of said sleeves being provided with vertical standards 27. Plates 28, provided with recesses to fit partially around the vertical portion 19 of axle 18, are secured upon the top of standards 27 by the bolts and nuts 29. Sleeves 26 are also provided with upward and descending pivots 30. Vertical apertures through beams 21, where cross-grooved, as at 22, register with similar apertures through concaved plates 23, which apertures accommodate the pivots 30 of sleeve 26, when such sleeve is inserted through the opening 25. Handles 31 are attached to the rear end of the beams 21, and the front ends of said beams are longitudinally slotted as at 32.

Standards 33, carrying the hoes or cultivating implement 34, are inserted into the groove 35 of the holder 36, such holder being provided with a right-angled groove 37 and an aperture 38, and its reverse face side having the notches 39, which engage with the notches 40 on plate 41, which latter is also provided with an aperture 42, its reverse side also being provided with the horizontal flanges 43, which flanges permit the beam 21 to be inserted between the same. The eyebolt 44 is inserted through the aperture 38 of holder 36 and the aperture 42 of plate 41, its eye 45 holding the standard 33 in position in said groove 35, and its threaded end is passed through the horizontal slot 32 of beam 21, where it is secured in position by the washer 46 and nut 47.

When my machine is used solely as a cultivator, but one plate 28 is secured upon the top of standard 27, so that in moving the beam and its attached handle upward or downward of that side the recessed portion of said plate 28, which partially straddles or reaches around the vertical part 19 of axle 18, causes said axle to rotate with it upon its bearings in the hubs of wheels 20. The other plate 28 being removed from the top of the other standard 27, the moving of the other beam and handle upward or downward causes the other sleeve 26 to rotate upon the axle, thus permitting one beam to move vertically without vertical movement being imparted to the other beams. It will be readily seen that other devices than the recessed part of plate 28 may be constructed to accomplish the same result, and which may be mechanical equivalents. Lateral independent movement of each of the beams 21 is afforded by the pivotal attachment through pivots 30 to the sleeve 26.

The seeder attachment consists of a rectangular box 48, supported by the band 49 on the plates 28 of the standards 27, and secured in position by the bolts and nuts 29. The box 48 has a central opening in its bottom, as at 50, with inner pieces 51 arranged at angles to guide the seed placed in said box to said opening. A plate 52, with an orifice 53 therein, with a corresponding under plate 54, with a similar orifice, are hinged together. A bolt 55 passes upward through a suitable aperture in plate 54 and through the slot 56 in plate 52, the upper end of which bolt is screw-threaded to accommodate the nut 57. By sliding or swinging the under plate 54 the size of the orifice 53 may be diminished, and through nut 57 they may be held in such position. A vertical rod 58 hinges together the plates 52 and 54, the bottom of which rod passes through the bottom of box 48. The upper plate 52 is pivoted to said rod by the pivot 59, so as to move therewith. The vertical rod 58 is bent horizontally at the top of box 48 so as to form the horizontal bar 60, which is also bent, as at 61, to accommodate the vertical part 19 of axle 18, and the extreme outer end is also bent downward, as at 62. A spiral spring 63 is connected at one end to said bar 61, the other end being connected to the top of the side of said box 48 in the rear of said bar. The plates 52 and 54 are so arranged in connection with said rod 58 that said spring in its normal or inactive position holds said plates over the opening 50 in the bottom of said box 48, so that the orifices 53 in said plates will not register with said openings 50 in said box, and when in such position seed in said box will not drop through such opening 50. Upon one or more of the spokes 64 of the wheel 20 are placed projections 65, and upon the rotation of said wheel in moving the machine forward such projections 65 come in contact with the part 62 of bar 60, forcing said bar and its attached plates 52 and 54 forward, so that the orifices 53 will register with the opening 50 and the seed in said box drop through the same. After the wheel has sufficiently rotated, the projection 65 disengages with the part 62 of bar 60, and the tension of the spring 63 pulls the plates 52 and 54 and rod 58 and its bar 60 back, so as to cause the orifice 53 not to register with said opening 50. Beneath the opening 50 is attached to said box a seed-drill 66, through which the seed is conveyed to the earth. To the rod 58 are attached the curved pendent rods 67, 68, and 69, which move with said rod to stir the seeds in said box.

I am aware that it is old in cultivators to extend the beams forward of the wheel-axle, connecting such beams forward of the axle by a yoke and attaching to such beams or yoke, forward of the axle, cultivating implements which may be raised and lowered and adjusted laterally; that it is also old to so attach such beams, when connected by such yoke, to the axle, so that their forward ends may be moved up and down simultaneously with the axle, or rotated simultaneously on the axle by depressing and elevating rearwardly-extending handles from such beams, and that in such constructed machines simultaneous lateral motion in the same direction may be imparted to the beams by moving the frame on the wheel or wheels sidewise, using such wheel or wheels as a pivot in so doing.

From the description herein given the mode of operation of my machine may be readily understood.

What I claim as new, and desire to secure by Letters Patent, is—

1. In a cultivator having an axle and wheels, the combination therewith of two beams cross-grooved at the axle and with slotted forward extensions, the perforated concave plates 23, and sleeves 26, fitted upon the axle having vertical standards 27, and pivots 30, whereby each beam may have independent movement upon the axle, substantially as described.

2. The combination, with the frame or axle, of the grooved and slotted beams, the plates 23, sleeves 26, with standards 27 and pivots 30, and the plates 28, recessed to embrace an arched axle, whereby one beam may be made rigid with the axle while the other may rotate freely thereon, substantially as described.

3. The combination of the axle and wheels, the beams having longitudinal slots at their front ends for exchangeable cultivating-tools and with cross-slots at their rear ends, and the handles vertically adjustable on the beams, substantially as shown and described.

MARSHELL E. HUNT.

Witnesses:
GEORGE R. MARVIN,
FRED P. BEMIS.